United States Patent Office 3,169,998
Patented Feb. 16, 1965

3,169,998
SEPARATION OF HYDROCARBON MIXTURES WITH THE USE OF GAMMA-BUTYROLACTONE
Paul N. Rylander, Newark, N.J., and William A. Junk, Jr., Homewood, Ill., assignors to Standard Oil Company, Chicago, Ill., a corporation of Indiana
No Drawing. Filed Nov. 2, 1959, Ser. No. 850,040
6 Claims. (Cl. 260—666)

This application is a continuation-in-part of our currently copending application S.N. 578,883, filed April 18, 1956, entitled "Treatment of Hydrocarbons," now abondoned, which in turn is a continuation-in-part of our then copending application S.N. 457,776, filed September 22, 1954, entitled "Treatment of Hydrocarbon," now abandoned.

This invention relates to a process for the partial or complete resolution of certain mixtures of normally liquid hydrocarbons into their components by selective separation thereof with gamma-butyrolactone.

It is one object of this invention to provide a process for the selective separation of certain mixtures of normally liquid hydrocarbons with gamma-butyrolactone. A further object is to provide for the employment of gamma-butyrolactone in a process for the selective extraction of olefinic hydrocarbons from liquid mixtures thereof with saturated hydrocarbons, e.g., naphthenic and/or paraffinic hydrocarbons. Another object is to provide a process for the selective extraction of isoparaffinic and naphthenic hydrocarbons from the normal paraffins. One more object is to provide a process for separating aromatic hydrocarbons from olefin hydrocarbons. Yet another object is to provide a process for the selective extraction of heterocyclic compounds from saturated hydrocarbons. Another further object of this invention is to provide a process for the separation of certain close-boiling or azeotropic mixtures of hydrocarbons by selective extraction with liquid gamma-butyrolactone. An additional object is to provide a process for refining certain hydrocarbon oils by extraction with liquid gamma-butyrolactone. These and other objects and advantages will become apparent from the ensuing description of the invention.

Gamma-butyrolactone freezes at $-44°$ C. and has a normal boiling point of $204°$ C. Its specific gravity (25/4° C.) is 1.124. It is completely miscible with water, methanol, ethyl ether, carbon tetrachloride and similar solvents.

The suitability of gamma-butyrolactone as a selective solvent for the purposes of our invention is extremely surprising. Thus its lower adjacent homolog, beta-propiolactone, can not be practically used as a selective solvent in mixed hydrocarbon extraction because it is violently reactive with substances containing active hydrogen, e.g., water, or metal salts, which sometimes induce polymerization of this lactone at an explosive rate. The next adjacent higher homolog of gamma-butyrolactone, gamma-valerolactone, is miscible at room temperature in all proportions with toluene-heptane mixtures. Delta-valerolactone condenses readily to form polyesters. There is no isomeric beta-butyrolactone, since beta-hydroxybutyric acid dehydrates to form beta-methylacrylic acid rather than the lactone.

The data obtained in various examples are supplied hereinafter in order specifically to illustrate our invention. In Table 1 are presented data obtained in equilibrium batch extraction of certain binary mixtures of hydrocarbons of diverse structural type. In all the extractions, equal volumes of feed and gamma-butyrolactone were used. The liquid phases were contacted until equilibrium was established, the liquid raffinate and extract phases were then allowed to settle by gravity, the phases were then separated and the solvent was separated from each phase by extraction with water. All the percentages reported in the tables are on a volume basis. The separation factor, $\beta$, is defined as follows:

$$\beta = \left(\frac{\text{Vol. percent Component A}}{\text{Vol. percent Component B}}\right) \text{extract} \Big/ \left(\frac{\text{vol. percent Component A}}{\text{vol. percent Component B}}\right) \text{raffinate}$$

On this basis, a $\beta$ factor of unity indicates no separation. An empirical correlation between the number of stages required to effect substantially complete separation of a mixture (at a practical reflux ratio) and the separation factor is that of Colburn et al., which indicates that the number of stages is equal to $18.4/\beta - 1$ (Trans.. Am. Inst. Chem. Engrs. 41, 421–3 and 645 (1945).

TABLE 1

*Extraction of various hydrocarbon types with gamma-butyrolactone*

| Example | Feed Components | | Extr'n Temp., °C. | V. Percent Component A | | | Vol. Percent of Feed Extracted | Vol. Percent of A Extracted | Separation Factor, $\beta$ |
|---|---|---|---|---|---|---|---|---|---|
| | A | B | | Feed | Extract | Raffinate | | | |
| 1 | 1-octene | n-Heptane | 25 | 49.1 | 66.7 | 48.7 | 2.5 | 6.6 | 2.1 |
| 2 | Methyl-cyclohexane | do | 25 | 48.2 | 63.2 | 47.9 | 1.8 | 2.4 | 1.9 |
| 3 | Cyclohexene | n-Hexane | 25 | 50.8 | 70.5 | 41.4 | 32.3 | 44.8 | 3.4 |
| 4 | Thiophene | N-Heptane | 25 | 47.5 | 70.2 | 10.9 | 61.8 | 91.4 | 19.4 |
| 5 | Toluene | 1-octene | 25 | 46.5 | 56.2 | 25.3 | 68.8 | 83.1 | 3.8 |
| 6 [1] | do | do | 25 | 46.5 | 76.7 | 35.8 | 26.1 | 43.0 | 5.9 |

[1] The solvent contained 10.5 weight percent of water.

It will be noted from the data in Table 1 that gamma-butyrolactone displays interesting selective extraction properties. Example 4 shows that the lactone solvent is highly selective for a heterocyclic compound, viz. thiophene, compared with its solvent power for a saturated hydrocarbon. Gamma-butyrolactone would be an excellent solvent for pyridine bases and the like for mixtures thereof with various materials, as in coal tar distillates, etc. Examples 5 and 6 illustrate aromatics-olefins separations, which are ordinarily difficult to obtain.

In Table 2, data are listed to show the effect of butyrolactone as an extractive distillation solvent. These data were obtained by boiling a system of known composition at total reflux until equilibrium was established and withdrawing a small amount of the distillate. Analysis of the distillate was made by refractive index determination after removing the solvent by water washing. The data show that butyrolactone is effective in enhancing the separation of aromatics from naphthenes by extractive distillation. Data for a system containing no solvent are included for comparison in Example 7.

TABLE 2

*Extractive distillation with gamma-butyrolactone*

| Ex. | Feed Components | | Solvent, Wt. Percent of Feed | Volume Percent Component A | | Separation Factor, $\beta^1$ |
|---|---|---|---|---|---|---|
| | A | B | | Distillate | Residue | |
| 7 | Benzene | Cyclohexane | 0.1 | 48.7 | 48.7 | 1.00 |
| 8 | do | do | 82.8 | 21.3 | 48.7 | 3.52 |
| 9 | do | do | 88.0 | 20.6 | 48.7 | 3.67 |
| 10 | do | do | 90.5 | 15.6 | 48.7 | 4.54 |

$^1 \beta = \left(\frac{\text{Vol. \% Comp. A}}{\text{Vol. \% Comp. B}}\right)$ distillate $\left(\frac{\text{Vol. \% Comp. B}}{\text{Vol. \% Comp. A}}\right)$ residue.

The selectivity of the gamma-butyrolactone may be increased not only by the addition of water, particularly between about 5 and about 10 weight percent of water; but also by the addition of about 1 to about 20 weight percent of various inorganic salts such as zinc chloride, cobalt chloride, organic salts, etc.

The foregoing examples have illustrated specific aspects of our invention, which is not limited thereto. The extraction process of the present invention is readily applicable to the separation of these other hydrocarbon mixtures: olefins from naphthenes, cycloolefins from acyclic olefins, monoolefins from conjugated diolefins, conjugated diolefins from nonconjugated diolefins, and diolefins from aromatics.

In general, liquid-liquid extraction operations can be conducted with gamma-butyrolactone at temperatures between about −40° C. and about 200° C., depending upon the particular charging stock, the solvent:feed ratio, the number of extraction stages, the degree of extraction which is sought, the proportions of auxiliary solvents (if any), etc. Usually liquid-liquid extraction with gamma-butyrolactone is effected at temperatures between about 50° C. and about −40° C. and, where very high selectivity is desired, we prefer to employ temperatures between about +10° C. or +5° C. and about −40° C.

The ratio of solvent to feed stock, in liquid-liquid extractions, must be sufficient to exceed its solubility under the extraction conditions in said feed stock in order to form two distinct liquid phases, viz. a raffinate phase containing little or no solvent, and an immiscible extract phase in which extracted hydrocarbons or heterocyclics are the solute. Generally, we may employ between about 0.5 and about 50 volumes of solvent per volume charging stock. Ordinarily, we prefer to employ between about 1 and about 20 volumes of solvent per volume of feed stock. Sufficient pressure is maintained within the extraction zone to prevent substantial volatilization of the charging stock or solvent under the liquid-liquid extraction conditions and it is obvious that pressure and temperature are related variables in the extraction process. Usually pressures within the range of about 0 to about 100 p.s.i.g. are sufficient, it being appreciated that the particular pressure which is required in a given case can readily be determined by experiment.

It may be desirable to employ diluents or auxiliary solvents with gamma-butyrolactone in specific cases in order to modify solvent selectivity, to lower the solvent melting point (thereby permitting extraction to be effected at relatively low temperatures, well below the melting point of the solvent) or for other reasons. The amount of auxiliary solvent can be selected with reference to specific cases; ordinarily, between about 1 and about 20 weight percent or even more, based on the lactone solvent, may be employed. The auxiliary solvent should be miscible to the desired extent with the lactone solvent, should exert no hydrolytic effects under the extraction conditions and should preferably be a neutral compound. As examples of auxiliary solvents which may be employed, one may mention anhydrous liquid sulfur dioxide, the sulfolanes, for example, 2,4-dimethylsulfolane, 2,3-dimethylsulfolane and the like; various nitriles such as acetonitrile, bis-2-cyanoethyl ether and the like; various ethers such as diethyl ether, methyl-tert-butyl ether; glycols or their ethers having the structure $R_1O(CH_2CH_2O)_nR_2$ and

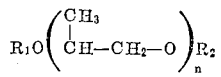

wherein $R_1$ and $R_2$ are hydrogen or alkyl groups and $n$ is an integer having a value between 1 and 3, inclusive, tetrahydrofuran and the like; halogenated hydrocarbon solvents such as chloroform, carbon tetrachloride, ethylene dichloride, ethylene dibromide, trichloroethane, tetrachloroethane and the like; esters of carbonic acid, monocarboxylic acids, and dicarboxylic acids, for instance, ethylene carbonate, diethyl carbonate bis-2-hydroxyethyl carbonate, bis-2-chloroethyl carbonate, bis-2-methoxyethyl carbonate, n-butyl formate, methyl furoate, dimethyl oxalate, diethyl succinate, dimethyl phthalate, dimethyl isophthalate, and the like; neutral organic nitrogen compounds such as N,N-dialkyl formamides (particularly dimethyl formamide), dimethylhydantoin and the like, nitroaromatics such as nitrobenzene and the like, ketones, for example, acetone, methyl ethyl ketone, methyl isobutyl ketone and the like; aldehydes, for example, furfural, crotonaldehyde and the like, etc.

Anti-solvents or diluents may also be employed in the practice of the present invention. Thus, diluents such as saturated hydrocarbons, perfluorocarbons, perfluoroamines, perfluoroethers, etc. may be added to the feed stock to be extracted or introduced directly into the extraction zone. In the process of the present invention the selective solvent is employed as a liquid, melt or solution and the feed stock may be charged to the process as a liquid or solution, or, in some instances, as vapors (extractive distillation).

In extractive distillation, the temperature should be between the dew point of the mixture and about 250° C. and contacting of the liquid solvent and feed vapors is usually countercurrent. The solvent is fed at such a rate as to maintain a solvent concentration in the liquid phase between 5 and 99 volume percent.

The present invention can be carried out in batch, continuous or semi-continuous operating cycles, and in one or more actual or theoretical stages, employing contacting and separation equipment such as has heretofore been employed in the selective solvent refining of petroleum stocks or the like, e.g. packed or pulsed columns. Various types of liquid-liquid extraction operations and suitable extraction equipment are described, for example, in "Chemical Engineers' Handbook" (McGraw-Hill Publishing Co., N.Y., 1950), pp. 716 ff. and 747 ff.

Any suitable means of separating extract from the extract phase and of recovering solvent therefrom may be employed. Thus under certain conditions, it may be desirable to distill the solvent from a relatively involatile extracted material, to distill volatile extract from the solvent, to crystallize the solvent therefrom at suitable temperatures, etc. The solvent can in some instances be recovered from the extract layer by washing with another solvent, e.g., cold water, ethers, or a paraffin having a boiling point different from the extract, etc.

Conventional techniques of solvent extraction employing raffinate and/or extract recycle to the extraction column to increase separating efficiency can be practiced.

Having thus described our process, what we claim is:

1. A process for the selective separation of a normally liquid olefinic hydrocarbon from a mixture thereof with a normally liquid naphthenic hydrocarbon, which process comprises contacting said mixture with liquid gamma-butyrolactone in an amount sufficient at least to form a distinct liquid phase, and separating a liquid extract phase comprising said olefinic hydrocarbon.

2. A process for the selective separation of a normally liquid olefinic hydrocarbon from a mixture thereof with a normally liquid paraffinic hydrocarbon, which process comprises contacting said mixture with liquid gamma-butyrolactone in an amount sufficient at least to form a distinct liquid phase, and separating a liquid extract phase comprising said olefinic hydrocarbon.

3. A process for the selective separation of a normally liquid naphthenic hydrocarbon from a mixture thereof with a normally liquid paraffinic hydrocarbon, which process comprises contacting said mixture with liquid gamma-butyrolactone in an amount sufficient at least to form a distinct liquid phase, and separating a liquid extract phase comprising said naphthenic hydrocarbon.

4. In the separation of olefinic hydrocarbons from a normally liquid mixture of same and at least one of naphthenic and paraffinic hydrocarbons by solvent extraction and extractive distillation processes at temperatures of at least 20° C., the step of treating the mixture with a selective solvent consisting essentially of gamma-butyrolactone.

5. In the separation of naphthenic hydrocarbons from a normally liquid mixture of same and paraffinic hydrocarbons by solvent extraction and extractive distillation processes at temperatures of at least 20° C., the step of treating the mixture with a selective solvent consisting essentially of gamma-butyrolactone.

6. In the separation and recovery of cyclohexane from a mixture of cyclohexane and normal heptane, the step of treating said mixture with a selective solvent consisting essentially of gamma-butyrolactone.

References Cited in the file of this patent
UNITED STATES PATENTS

| | | |
|---|---|---|
| 2,407,820 | Durrum | Sept. 17, 1946 |
| 2,511,251 | Feasley | June 13, 1950 |
| 2,809,222 | Hawkins | Oct. 8, 1957 |
| 2,831,905 | Nelson | Apr. 22, 1958 |